3,848,007
PRODUCTION OF METHYLENE CHLORIDE
Luigi Forlano, Ferrara, Italy, assignor to
Solvay & Cie, Brussels, Belgium
Filed Mar. 10, 1971, Ser. No. 122,903
Claims priority, application Belgium, Mar. 12, 1970,
86,301
Int. Cl. C07c 17/10
U.S. Cl. 260—662 R                    9 Claims

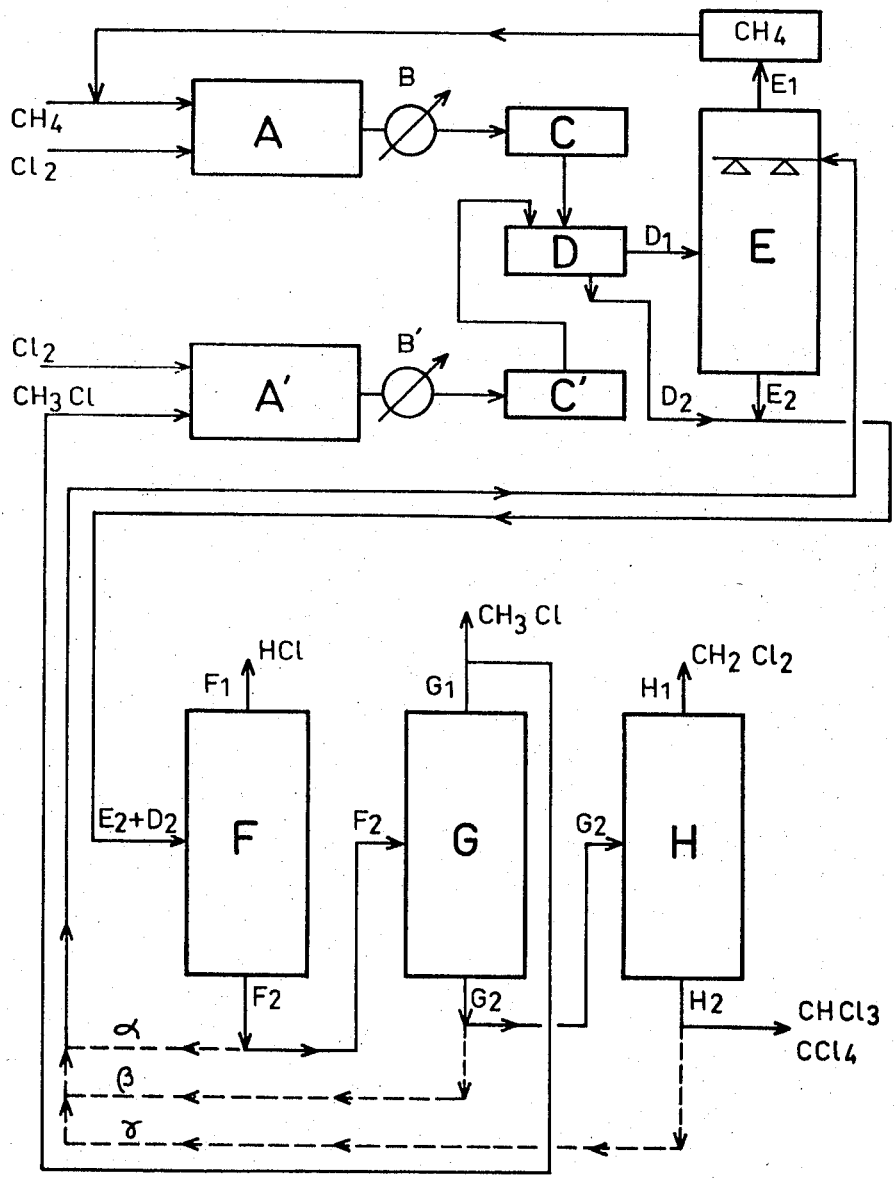

ABSTRACT OF THE DISCLOSURE

A process for producing methylene chloride by the chlorination of methane at a temperature between 200 and 500° C., in which process the mol ratio of chlorine to methane to be chlorinated is lower than 0.4, the chlorination products are condensed, hydrogen chloride is absorbed from a remaining uncondensed gas phase by washing with a washing liquid comprising a mixture of chlorinated methanes, the washed gas phase is returned to the chlorination zone, the liquid phase obtained from the washing is treated in a separation column to give a gas phase comprising dry hydrogen chloride and a liquid phase comprising a mixture of chlorinated methanes, and at least a part of this liquid phase is treated to separate at least the methylene chloride out of the methyl chloride, methylene chloride, chloroform and carbon tetrachloride present therein.

BACKGROUND OF THE INVENTION

This invention relates to the production of methylene chloride by the chlorination of methane at 200 to 500° C.

Various processes have already been proposed for directing the chlorination of methane preferentially towards the formation of methylene chloride. In German Pat. No. 472,481 (Karpen), it has been proposed that unconverted methane and methyl chloride separated when the crude product is condensed should be recycled to the chlorination zone, whereby it would be possible to obtain 80% methylene chloride and 20% of a mixture of chloroform and carbon tetrachloride; the mol ratio of chlorine to the methane plus methyl chloride entering the chlorination zone was to be between 0.1 and 0.3.

German Pat. No. 1,125,897 (Leuna-Werke) teaches that the proportion of methylene chloride formed can be increased by reducing the mol ratio of chlorine to the methane plus methyl chloride entering the chlorination zone below 0.2, the increase being particularly striking when this ratio is reduced from 0.188 towards 0.164.

The advantages of reducing the $Cl_2/(CH_4+CH_3Cl)$ ratio, e.g. from 0.2 to 0.1, so as to increase the ratio of the methylene chloride formed to the chloroform and carbon tetrachloride formed, have also been mentioned in later published documents, e.g. S. Lippert and G. Vogel, Chem. Tech., 1969, v. 21, No. 10, pp. 618 to 621.

Industrially however, the reduction of the $$Cl_2/(CH_4+CH_3Cl)$$

ratio has serious disadvantages; thus the lower this ratio, the greater the need to recycle unconverted methane and the greater the need to supply heat to the chlorination zone to maintain the requisite temperature therein, and the more difficult it will be to separate the desired product from the recycled material. To permit adiabatic operation, the $Cl_2/(CH_4+CH_3Cl)$ ratio should in fact, be at least 0.2 and should preferably approach 0.25.

A. Scipioni and E. Rapisardi (La Chimica e l'Industria, 1961, v. 43, No. 11, pp. 1286–1293), after a study of the kinetics of the chlorination of methane, proposed that methane and methyl chloride should be chlorinated separately, so that the recycling of methyl chloride would actually be avoided; in this way, also, the ratio of the methylene chloride formed to the chloroform and carbon tetrachloride formed is markedly increased. This proposal appears more suitable for industrial application, because it permits higher ratios of chlorine to the compound to be chlorinated ($CH_4$ or $CH_3Cl$) in each stage, these ratios being, in any case, at least equal to 0.2. This proposal makes possible a substantial reduction of the volume of the gas having to be circulating in a closed circuit, together with better thermal equilibrium within the chlorination zones; moreover, since the dimensions of a plant of a given output depend upon the volume of gas having to be circulated, this proposal also has the consequence that the cost of plant operated with higher values of these last-mentioned ratios will be smaller.

However, to put this proposal into practice industrially so that the proportion of the methylene chloride formed will be as high as possible, it is necessary that in the methane chlorination stage the proportion of methyl chloride mixed with the recycled methane should be as low as possible. The previously mentioned article by S. Lippert and G. Vogel does show, in fact, at p. 620, that the ratio of the methylene chloride formed to the chloroform formed passes through a minimum when the proportion of methyl chloride mixed with the methane during its chlorination is increased. This $CH_2Cl_2/CHCl_3$ ratio decreases in very marked manner when the proportion of methyl chloride in the methane is increased from 0 to 10%.

It is, therefore, important that the separation of unconverted methane should be as selective as possible.

Belgian Pat. No. 703,262 (Hoechst) provides a very substantial improvement in the separation of the products of the chlorination of methane. This improvement lies in separating the unconverted methane from its chlorination products, and from the hydrogen chloride also formed, by washing the reaction mixture with liquid methyl chloride. This process offers the advantage that it thus recovers dry hydrogen chloride which can be used directly in that form. Nevertheless, this method of separating the unconverted methane is not sufficiently selective, because methane is recycled which inevitably contains methyl chloride in a not inconsiderable proportion, e.g. 15 to 30% by volume.

This method of recovering methane, therefore, does not favor the attainment of a high ratio of the methylene chloride formed to the chloroform and carbon tetrachloride formed.

SUMMARY OF THE INVENTION

An object of the present invention, therefore, is to provide a process avoiding the various disadvantages of the processes which have just been described while at the same time making it possible for dry hydrogen chloride to be recovered.

This as well as other objects which will become apparent in the discussion that follows are achieved, according to the present invention, by a process for the production of methylene chloride by the chlorination of methane at a temperature between 200 and 500° C., in which process the mol ratio of chlorine to the methane to be chlorinated is lower than 0.4, the chlorination products are condensed, hydrogen chloride is absorbed from the uncondensed gas phase by washing with a washing liquid comprising a mixture of chlorinated methanes derived from a later part of the process, the washed gas phase is returned to the chlorination zone, the liquid phase obtained from said washing is treated in a separation column to give a gas phase comprising dry hydrogen chloride and a liquid phase comprising a mixture of chlorinated methanes, and at least a part of this liquid phase is treated to separate at least the methylene chloride out of the methyl chloride, methylene chloride, chloroform and carbon tetrachloride present therein.

BRIEF DESCRIPTION OF THE DRAWING

The sole figure of the drawing is a flow diagram for a preferred embodiment of the process of the invention.

DESCRIPTION OF THE PREFERRED EMBODIMENTS

In the apparatus shown in the figure, methane and $CH_3Cl$ are chlorinated respectively in the furnace reactors A and A'. After cooling in coolers B and B', and condensation in condensers C and C', the two chlorination-reaction products are combined in vessel D. The gas phase $D_1$ is washed in tower E by a liquid comprising chlorinated methanes, which is designated by $\alpha$, $\beta$ or $\gamma$ according to whether it comes from column F, G or H; in columns F, G and H, hydrogen chloride, methyl chloride and methylene chloride, respectively, are successively separated and led off at $F_1$, $G_1$ and $H_1$. The unreacted methane is recovered at $E_1$ and recycled to the furnace A. The two liquid phases $D_2$ and $E_2$ are pumped into the hydrogen chloride rectification column F from which hydrogen chloride is led off the top, i.e. at $F_1$, and the chlorinated methanes are led off at the bottom, i.e. at $F_2$ (liquid $\alpha$). The methyl chloride separated in column G is led off at $G_1$ and passed to the furnace A'; the bottom product of this column, comprising the higher chlorinated methanes, is led off at $G_2$ (liquid $\beta$). From the latter, methylene chloride is separated in the column H and led off at $H_1$; the bottom product of the column H comprises chloroform and carbon tetrachloride and is led off at $H_2$ (liquid $\gamma$).

The mol ratio of the chlorine to the methane to be chlorinated, which in any case is to be lower than 0.4, is preferably between 0.20 and 0.30. A ratio substantially equal to 0.25 is particularly preferred.

As specified above, the chlorination products are condensed. This condensation is only partial in that HCl product still remains as gas. The condensation may be effected by cooling and optionally by compression; the absolute pressure employed may be up to 15 atmospheres, and the temperature is preferably kept between $-15°$ C. and $-50°$ C. Advantageously, the pressure in the reactors is maintained between 1 and 20 atmospheres.

The liquid phase obtained by this condensation comprises a major part of chlorinated methanes formed, and a part of the hydrogen chloride by-product.

The gas phase in equilibrium with the liquid phase following this condensation contains all the unconverted methane, the remainder of the hydrogen chloride by-product, and a minor proportion of the chlorinated methanes (more particularly the more volatile of these compounds).

This gas phase is then washed (suitably in countercurrent) with a washing liquid comprising a mixture of chlorinated methanes derived from the production cycle. The unconverted methane can thus be separated at the top of the washing zone and recycled, while at the bottom of the washing zone chlorinated methanes and hydrogen chloride can be removed in liquid form and combined with the liquid phase resulting from the condensation. The liquid phase so obtained can then be treated to separate therefrom first the hydrogen chloride and then the various chlorinated methanes by distillation in a series of separation columns.

The washing operation may be carried out either adiabatically, for example, in a packed column, or isothermally, for example, with cooled film nest of tubes. The pressure may be up to 15 atmospheres, and the temperature is advantageously between $-10$ and $-50°$ C.

As already specified, the washing liquid comprises a mixture of chlorinated methanes. The amount of washing liquid required will depend upon its exact composition and also on the desired degree of absorption of the hydrogen chloride.

It is thus possible to use as the washing liquid, the liquid comprising all four chlorinated methanes obtained at the bottom of the hydrogen chloride separation column. In this case, for one mol of hydrogen chloride leaving the chlorination zone, washing liquid containing 3 to 6 moles of chlorinated methanes is required. The greater the amount of washing liquid used, the greater will be the proportion of hydrogen chloride absorbed. Owing to the presence of all four of the chlorinated methanes in the washing liquid, the partial pressure of the methyl chloride remains low, so that for a given temperature at the top of the washing zone the recycled unreacted methane will contain much less methyl chloride than if the washing liquid were composed solely of methyl chloride.

It is also possible to use a washing liquid free from methyl chloride, namely, the liquid obtained at the bottom of a methyl chloride separation column employed in the final liquid phase separation treatment. In this case, 4 to 8 moles of the washing liquid are required per mol of hydrogen chloride leaving the chlorination zone.

The vapor pressure of the chlorinated methanes used here being very low at the temperatures used, it is found that the recycled unreacted methane contains practically none of them.

It is further possible to use as the washing liquid, the liquid (a mixture of chloroform and carbon tetrachloride only) obtained at the bottom of a methylene chloride separation column employed in the final liquid phase separation treatment. 5 to 10 moles of this liquid are required per mol of hydrogen chloride leaving the chlorination zone.

Methyl chloride is not, in the present process, charged for chlorination together with the methane. The methyl chloride formed in the chlorination of the methane may be separated and then chlorinated separately. Either the whole or merely a part of this methyl chloride may be submitted to separate chlorination in this manner.

According to a preferred embodiment of the invention, the object of which is to increase still further the proportion of methylene chloride formed, two chlorination zones are concurrently employed as shown in the figure, one zone for methane and the other for methyl chloride, the products of the two chlorinations being condensed and then combined and treated as already described (with reference to the washing and subsequent steps). If desired, methyl chloride from another source, for example, the hydrochlorination of methanol, may also be chlorinated.

If, in this variant, the ratio of $Cl_2$ to $CH_4$ or $CH_3Cl$ is from 0.2 to 0.3 in each zone, it is readily possible to obtain a total mol ratio of the methylene chloride formed to the chloroform and carbon tetrachloride formed of the order of 7 to 9.

This procedure can thus give the following substantial advantages:

(1) Molar ratios of chlorine to the compound to be chlorinated which are higher than 0.2 can be used;

(2) The products of the separate chlorination of methyl chloride need contain no inert material, so that their condensation can be far more efficient than in the case of known processes for the chlorination of methane and methyl chloride; and (3) The pressure employed in the methyl chloride separation column can be adjusted to a value such that the methyl chloride can be recycled to its chlorination zone without re-compression.

The following examples further illustrate the invention. The processes of the examples were carried out in the apparatus shown in the figure as described in its description, and were carried out with the washing liquids $\alpha$, $\beta$ and $\gamma$ respectively.

EXAMPLE 1

(Performance of the process with liquid $\alpha$)

Furnace A was fed with:

5.38 kilomoles of a mixture of fresh $CH_4$ and recycled $CH_4$ from $E_1$, the latter containing 0.18 kilomoles of $CH_3Cl$ and a maximum of 0.18 kilomoles of HCl passing out with the $CH_4$ from $E_1$; and 1.30 kilomoles of $Cl_2$.

Furnace A' was fed with:

3.20 kilomoles of recycled $CH_3Cl$; and
0.80 kilomoles of $Cl_2$.

Composition of gas phase led off at $D_1$:

4.02 kilomoles of $CH_4$;
0.39 kilomoles of $CH_3Cl$; and
1.25 kilomoles of HCl.

Composition of liquid phase led off at $D_2$:

2.99 kilomoles of $CH_3Cl$;
0.88 kilomoles of $CH_2Cl_2$;
0.10 kilomoles of $CHCl_3$;
not more than 0.01 kilomoles of $CCl_4$; and
1.03 kilomoles of HCl.

The gas led off at $D_1$ was washed at E by a liquid $\alpha$ containing:

8.70 kilomoles of $CH_3Cl$;
2.39 kilomoles of $CH_2Cl_2$;
0.27 kilomoles of $CHCl_3$; and
ca. 0.03 kilomoles of $CCl_4$;

that is to say, approximately, 5 moles of chlorinated methanes per mole of HCl leaving the two furnaces.

The liquid led off at $E_2$ from E was mixed with the liquid led off from D at $D_2$, and the combined liquids were then passed to F, where they were separated into:

at $F_1$: 2.1 kilomoles of HCl;
at $F_2$: all the chlorinated methanes, from which liquid $\alpha$ was abstracted before introducing into G a liquid $F_2$ having the following composition:

3.20 kilomoles of $CH_3Cl$;
0.88 kilomoles of $CH_2Cl_2$;
0.10 kilomoles of $CHCl_3$; and
not more than 0.01 kilomoles of $CCl_4$.

The methyl chloride separated in G and led off at $G_1$ was all recycled to the furnace A', and the other chlorinated methanes were led off at $G_2$ and separated in H.

It was estimated that the molar ratio $$\frac{CH_2Cl_2}{CHCl_3+CCl_4}$$

in this example was 8, for a $Cl_2/CH_4$ ratio of 0.25.

In each of the tubular reactors A and A', the absolute pressure was 12 atm. The input temperature was 200° C. while the output temperature was 450° C. Leaving the reactors at 450° C., the gaseous products from A and A' were cooled up to 140° C. in the air-cooled means B and B'. Then, the gaseous products enter respectively in C and C' where the output temperatures were —5° C. C and C' were refrigerated with water and brine. A further refrigeration with brine in D gives a condensed product at —25° C. under an absolute pressure of 12 atm. In the tower E provided with cooled film nest of tubes, the absolute pressure was 12 atm. while the temperatures were: —45° C. at the top and —25° C. at the bottom.

The absolute pressure in the HCl column F was 16 atm. while $F_1$ and $F_2$ were obtained respectively at —20° C. and +78° C. For these reasons, the pressure of the two liquid phases $D_2$ and $E_2$ is raised up to 16 atm. by means of a compressor, and warmed by heat exchange with the liquid $\alpha$ withdrawn from $F_2$ and led in the tower E. Before reaching G, $F_2$ was expanded to 12 atm. which is the operating pressure of the $CH_3Cl$ column G. $F_1$ was obtained at 52° C. and $G_2$ at 150° C. Then, $G_2$ was also expanded to the atmospheric pressure under which the $CH_2Cl_2$ column H operated. At least H, was at 40° C. and $H_2$ at 65° C.

For all the apparatus steel was used as material of construction, except for the reactors A and A' which were made of stainless steel.

EXAMPLE 2

(Performance of the process with liquid $\beta$)

Furnace A was fed with:

5.38 kilomoles of a mixture of fresh $CH_4$ and recycled $CH_4$ from $E_1$, containing a maximum of 0.18 kilomoles of HCl passing out with the $CH_4$ at $E_1$; and 1.30 kilomoles of $Cl_2$.

Furnace A' was fed with:

3.20 kilomoles of recycled $CH_3Cl$; and
0.80 kilomoles of $Cl_2$.

Composition of the gas phase led off at $D_1$:

4.20 kilomoles of $CH_4$;
0.40 kilomoles of $CH_3Cl$; and
1.28 kilomoles of HCl.

Composition of the liquid phase led off at $D_2$:

2.80 kilomoles of $CH_3Cl$;
0.90 kilomoles of $CH_2Cl_2$;
0.09 kilomoles of $CHCl_3$;
not more than 0.01 kilomoles of $CCl_4$; and
1.00 kilomole of HCl.

The gas phase led off at $D_1$ was washed at E with a liquid $\beta$ containing:

12.09 kilomoles of $CH_2Cl_2$;
1.21 kilomoles of $CHCl_3$; and
ca. 0.15 kilomoles of $CCl_4$;

that is to say, approximately, 6 moles of chlorinated methanes per mol of HCl leaving the two furnaces.

The liquid led off at $E_2$ from E was mixed with the liquid led off from D at $D_2$, and the combined liquids were then passed to F, in which they were separated into:

at $F_1$: 2.1 kilomoles of HCl; and
at $F_2$: all the chlorinated methanes, these being passed to G where they were separated into:
at $G_1$: the $CH_3Cl$, this being recycled to furnace A'; and
at $G_2$: the liquid $\beta$ and a product having the following composition:
0.90 kilomoles of $CH_2Cl_2$;
0.09 kilomoles of $CHCl_3$; and
not more than 0.01 kilomoles of $CCl_4$.

It was estimated that the molar ratio $$CH_2Cl_2/CHCl_3+CCl_4$$

in this example was 9, for a $Cl_2/CH_4$ ratio of 0.25.

By using the liquid $\beta$ as washing liquid of the process, the temperature at the bottom of the HCl column F was 140° C.

All the other pressure and temperature conditions are the same as in the Example 1.

EXAMPLE 3

(Performance of the process with the liquid $\gamma$)

Furnace A was fed with:

5.38 kilomoles of a mixture of fresh $CH_4$ and recycled $CH_4$ from $E_1$, containing a maximum of 0.18 kilomoles of HCl passing out with the $CH_4$ at $E_1$; and 1.30 kilomoles of $Cl_2$.

Furnace A' was fed with:

3.20 kilomoles of recycled $CH_3Cl$; and
0.80 kilomoles of $Cl_2$.

Composition of the gas phase led off at $D_1$:

4.20 kilomoles of $CH_4$;
0.40 kilomoles of $CH_3Cl$; and
1.28 kilomoles of $HCl$.

Composition of the liquid phase led off at $D_2$:

2.80 kilomoles of $CH_3Cl$;
0.90 kilomoles of $CH_2Cl_2$;
0.09 kilomoles of $CHCl_3$;
not more than 0.01 kilomoles of $CCl_4$; and
1.00 kilomole of $HCl$.

The gas phase led off at $D_1$ was washed at E by a liquid γ containing:

17.0 kilomoles of $CHCl_3$; and
1.7 kilomoles of $CCl_4$;

that is to say, approximately, 8 moles of chlorinated methanes per mol of HCl leaving the two furnaces.

The liquid led off at $E_2$ from E was mixed with the liquid led off from D at $D_2$, and the combined liquids were then passed to F, where they were separated into:

at $F_1$: 2.10 kilomoles of HCl; and
at $F_2$: all the chlorinated methanes, these being passed to G, where they were separated into:
at $G_1$: the $CH_3Cl$, this being recycled to furnace A'; and
at $G_2$: the other chlorinated methanes, these being passed to H, where they were separated into:
at $H_1$: 0.90 kilomoles of $CH_2Cl_2$ product; and
at $H_2$: the liquid γ and a product having the following composition:

0.09 kilomoles of $CHCl_3$; and
not more than 0.01 kilomoles of $CCl_4$.

It was estimated that the molar ratio $$CH_2Cl_2/CHCl_3+CCl_4$$

in this example was 9, for a $Cl_2/CH_4$ ratio of 0.25.

By using the liquid γ, the bottom of F was maintained at 140° C., while the bottom of G was maintained at 160° C.

All the other pressure and temperature conditions are the same as in the Example 1.

It will be understood that the above description of the present invention is susceptible to various modifications, changes and adaptations, and the same are intended to be comprehended within the meaning and range of equivalents of the appended claims.

What is claimed is:

1. A process for producing methylene chloride comprising the steps of
   (a) chlorinating methane at a temperature between 200 and 500° C., the molar ratio of chlorine to methane to be chlorinated being between 0.2 and 0.4;
   (b) partially condensing the products of step (a) at a temperature between −15 and −50° C. and pressure of up to 15 atmospheres to form a gas phase containing methane, hydrogen chloride and a minor proportion of chlorinated methanes and a liquid phase comprising chlorinated methanes and hydrogen chloride;
   (c) absorbing hydrogen chloride from said gas phase obtained in step (b) by washing at a temperature between −10 and −50° C. and a pressure of up to 15 atmospheres with a liquid mixture of chlorinated methanes in a proportion of 3 to 6 moles of chlorinated methane per mole of hydrogen chloride present in the products of chlorinating step (a) to give a liquid phase enriched in hydrogen chloride and a gas phase containing methane;
   (d) recycling said gas phase from step (c) to chlorinating step (a);
   (e) combining said liquid phase from step (b) with said liquid phase resulting from step (c) to give a liquid mixture;
   (f) separating the liquid mixture from step (e) in a hydrogen chloride distillation column to give dry gaseous hydrogen chloride as an overhead fraction and a liquid mixture of chlorinated methanes as a bottom fraction;
   (g) using part of said liquid bottom fraction from step (f) as the liquid mixture of chlorinated methanes in absorbing step (c);
   (h) distilling the other part of said liquid bottom fraction from step (f) to separate a liquid mixture of chlorinated methanes comprising methylene chloride, chloroform and tetrachloromethane as a bottom fraction and to separate the methyl chloride as an overhead fraction; and
   (i) distilling said liquid mixture from step (h) to recover methylene chloride therefrom.

2. A process as claimed in claim 1, in which the mol ratio of the chlorine to the methane to be chlorinated is between 0.20 and 0.30.

3. A process as claimed in claim 2, in which the mol ratio of the chlorine to the methane to be chlorinated is about 0.25.

4. A process as claimed in claim 1, further comprising the steps of
   (a') chlorinating the methyl chloride obtained in step (h) in a separate furnace reactor concurrently with chlorinating step (a);
   (b') partially condensing the products of chlorinating methyl chloride step (a'); and
   (c') combining the products obtained in step (b') with the products obtained in step (b) to obtain a gas phase and a liquid phase which are sent, respectively, as the gas phase to step (c) and as the liquid phase to the combining step (e).

5. A process as claimed in claim 4, in which, for each step of chlorinating, the mol ratio of chlorine to the compound to be chlorinated is between 0.2 and 0.3.

6. A process for producing methylene chloride comprising the steps of
   (a) chlorinating methane at a temperature between 200 and 500° C., the molar ratio of chlorine to methane to be chlorinated being between 0.2 and 0.4;
   (b) partially condensing the products of chlorinating step (a) at a temperature between −15 and −50° C. and pressure of up to 15 atmospheres to form a gas phase containing methane, hydrogen chloride and a minor proportion of chlorinated methanes and a liquid phase comprising chlorinated methanes and hydrogen chloride;
   (c) absorbing hydrogen chloride from said gas phase obtained in step (b) by washing at a temperature between −10 and −50° C. and a pressure of up to 15 atmospheres with a liquid mixture of chlorinated methanes comprising methylene chloride, chloroform and tetrachloromethane, in a proportion of 4 to 8 moles of chlorinated methanes per mole of hydrogen chloride present in the products of chlorinating step (a) to give a liquid phase enriched in hydrogen chloride and a gas phase containing methane;
   (d) recycling said gas phase from step (c) to chlorinating step (a);
   (e) combining said liquid phase from step (b) with said liquid phase resulting from step (c) to give a liquid mixture;
   (f) separating the liquid mixture resulting from step (e) in a hydrogen chloride distillation column to give dry gaseous hydrogen chloride as an overhead fraction and a liquid mixture of chlorinated methanes comprising methyl chloride, methylene chloride, chloroform and tetrachloromethane as a bottom fraction;
(g) distilling said liquid mixture from step (f) to separate a liquid mixture of chlorinated methanes comprising methylene chloride, chloroform and tetrachloromethane, as a bottom fraction and to separate the methyl chloride as an overhead fraction;
(h) using part of said liquid bottom fraction from step (g) as the liquid mixture of chlorinated methanes in absorbing step (c); and
(i) distilling the other part of said liquid bottom fraction from step (g) to recover methylene chloride therefrom.

7. A process as claimed in claim 6 further comprising the steps of
(a') chlorinating the methyl chloride obtained in step (g) in a separate furnace reactor concurrently with chlorinating step (a);
(b') partially condensing the products of chlorinating methyl chloride step (a'); and
(c') combining the products obtained in step (b') with the products obtained in step (b) to obtain a gas phase and a liquid phase which are sent, respectively, as the gas phase to step (c) and as the liquid phase to the combining step (e).

8. A process for producing methylene chloride comprising the steps of
(a) chlorinating methane at a temperature between 200 and 500° C., the molar ratio of chlorine to methanes comprising chloroform and tetrachloro- 0.4;
(b) partially condensing the products of step (a) at a temperature between −15 and −50° C. and pressure of up to 15 atmospheres to form a gas phase containing methane, hydrogen chloride and a minor proportion of chlorinated methanes and a liquid phase comprising chlorinated methanes and hydrogen chloride;
(c) absorbing hydrogen chloride from said gas phase obtained in step (b) by washing at a temperature between −10 and −50° C. and a pressure of up to 15 atmospheres with a liquid mixture of chlorinated methanes comprising chloroform and tetrachloromethane in a proportion of 5 to 10 moles of chlorinated methanes per mole of hydrogen chloride present in the products of chlorinating step (a) to give a liquid phase enriched in hydrogen chloride and a gas phase containing methane;
(d) recycling said gas phase from step (c) to chlorinating step (a);
(e) combining said liquid phase from step (b) with said liquid phase resulting from step (c) to give a liquid mixture;
(f) separating the liquid mixture from step (e) in a hydrogen chloride distillation column to give dry gaseous hydrogen chloride as an overhead fraction and a liquid mixture of chlorinated methanes comprising methyl chloride, methylene chloride, chloroform and tetrachloromethane as a bottom fraction;
(g) distilling said liquid mixture resulting from step (f) to separate a liquid mixture of chlorinated methanes comprising methylene chloride, chloroform and tetrachloromethane as a bottom fraction and the methyl chloride as an overhead fraction;
(h) distilling said liquid mixture of chlorinated methanes from step (g) to separate methylene chloride from residual liquid fraction of chlorinated methanes comprising chloroform and tetrachloromethane;
(i) using said liquid fraction from step (h) as the liquid mixture for absorbing hydrogen chloride in absorbing step (c); and
(j) recovering the methylene chloride separated in step (h).

9. A process as claimed in claim 8 further comprising the steps of
(a') chlorinating the methyl chloride obtained in step (g) in a separate furnace reactor concurrently with chlorinating step (a);
(b') partially condensing the products of chlorinating methyl chloride step (a'); and
(c') combining the products obtained in step (b') with the products obtained in step (b) to obtain a gas phase and a liquid phase which are sent, respectively, as the gas phase to step (c) and as the liquid phase to the combining step (e).

References Cited
UNITED STATES PATENTS

| | | | |
|---|---|---|---|
| 2,402,978 | 7/1946 | Allen et al. | 260—662 R |
| 3,126,419 | 3/1964 | Burks et al. | 260—662 R |
| 3,502,734 | 3/1970 | Baird et al. | 260—658 R |
| 2,406,195 | 8/1946 | Cass | 260—658 R |

FOREIGN PATENTS

| | | | |
|---|---|---|---|
| 703,262 | 2/1968 | Belgium | 260—662 R |

OTHER REFERENCES

Scipioni et al.: Chimica e l'Industria, 43, No. 11, pp. 1286–1293 (1963).

BERNARD HELFIN, Primary Examiner

J. A. BOSKA, Assistant Examiner

U.S. Cl. X.R.

260—658 R